United States Patent
Grover et al.

(10) Patent No.: US 9,361,079 B2
(45) Date of Patent: Jun. 7, 2016

(54) METHOD FOR COMPILING A PARALLEL THREAD EXECUTION PROGRAM FOR GENERAL EXECUTION

(75) Inventors: Vinod Grover, Mercer Island, WA (US);
Andrew Kerr, McDonough, GA (US);
Sean Lee, Redmond, WA (US)

(73) Assignee: NVIDIA Corporation, Santa Clara, CA (US)

(*) Notice: Subject to any disclaimer, the term of this patent is extended or adjusted under 35 U.S.C. 154(b) by 696 days.

(21) Appl. No.: 13/361,408

(22) Filed: Jan. 30, 2012

(65) Prior Publication Data
US 2013/0198494 A1   Aug. 1, 2013

(51) Int. Cl.
*G06F 9/44*   (2006.01)
*G06F 9/45*   (2006.01)

(52) U.S. Cl.
CPC ........................................ *G06F 8/53* (2013.01)

(58) Field of Classification Search
CPC ............................................. G06F 8/45–8/456
See application file for complete search history.

(56) References Cited

U.S. PATENT DOCUMENTS

| | | | | |
|---|---|---|---|---|
| 4,833,606 A * | 5/1989 | Iwasawa | ................ | G08F 8/452 717/160 |
| 5,317,743 A * | 5/1994 | Imai | ........................ | G06F 8/452 717/160 |
| 5,349,665 A * | 9/1994 | Endo | ........................ | G08F 8/45 717/160 |
| 5,437,034 A * | 7/1995 | Tanaka | .................... | G06F 8/452 717/160 |
| 5,737,623 A * | 4/1998 | Liebrock | ......................... | 712/13 |
| 5,774,730 A * | 6/1998 | Aizikowitz et al. | ........... | 717/157 |
| 5,802,375 A * | 9/1998 | Ngo | ........................ | G06F 8/452 717/150 |
| 5,842,022 A * | 11/1998 | Nakahira | ................ | G06F 8/452 717/154 |
| 5,999,734 A * | 12/1999 | Willis | ........................ | G06F 8/10 709/200 |
| 6,029,002 A * | 2/2000 | Afifi et al. | ........................ | 717/131 |
| 6,038,398 A * | 3/2000 | Schooler | ................ | G06F 8/452 717/160 |
| 6,059,841 A * | 5/2000 | Caracuzzo | .............. | G06F 8/452 717/154 |
| 6,226,789 B1 * | 5/2001 | Tye et al. | ........................ | 717/138 |
| 6,357,041 B1 * | 3/2002 | Pingali et al. | ................. | 717/154 |
| 6,438,747 B1 * | 8/2002 | Schreiber | ................ | G06F 8/452 717/160 |
| 6,964,029 B2 * | 11/2005 | Poznanovic | ........ | G06F 17/5045 716/105 |
| 7,155,708 B2 * | 12/2006 | Hammes | ............. | G06F 17/5022 717/132 |
| 7,299,458 B2 * | 11/2007 | Hammes | ............. | G06F 17/5045 716/103 |
| 7,996,827 B2 * | 8/2011 | Vorbach | .................. | G06F 8/447 717/121 |
| 8,266,604 B2 * | 9/2012 | Groff et al. | .................... | 717/146 |

(Continued)

OTHER PUBLICATIONS

NVIDA CUDA C Programming Guide Version 3.1.1 published by NVIDIA, Jul. 21, 2010, pp. 1-161.*

(Continued)

*Primary Examiner* — Zheng Wei
(74) *Attorney, Agent, or Firm* — Artegis Law Group, LLP (57) ABSTRACT

A technique is disclosed for executing a compiled parallel application on a general purpose processor. The compiled parallel application comprises parallel thread execution code, which includes single-instruction multiple-data (SIMD) constructs, as well as references to intrinsic functions conventionally available in a graphics processing unit. The parallel thread execution code is transformed into an intermediate representation, which includes vector instruction constructs. The SIMD constructs are mapped to vector instructions available within the intermediate representation. Intrinsic functions are mapped to corresponding emulated runtime implementations. The technique advantageously enables parallel applications compiled for execution on a graphics processing unit to be executed on a general purpose central processing unit configured to support vector instructions.

21 Claims, 5 Drawing Sheets

(56) References Cited

U.S. PATENT DOCUMENTS

| | | | |
|---|---|---|---|
| 8,448,156 B2 * | 5/2013 | Demetriou et al. | 717/149 |
| 8,561,037 B2 * | 10/2013 | Wallach et al. | 717/140 |
| 8,572,588 B2 * | 10/2013 | Grover et al. | 717/140 |
| 8,572,595 B1 * | 10/2013 | Lethin | G06F 8/443 717/127 |
| 8,612,732 B2 * | 12/2013 | Grover et al. | 712/241 |
| 8,671,401 B2 * | 3/2014 | Puri | G06F 8/433 717/140 |
| 8,776,030 B2 * | 7/2014 | Grover et al. | 717/137 |
| 8,869,121 B2 * | 10/2014 | Vorbach | G06F 8/447 717/140 |
| 8,869,126 B2 * | 10/2014 | Guenthner | G06F 8/456 717/146 |
| 9,244,677 B2 * | 1/2016 | Vasudevan | G06F 8/70 |
| 2001/0020293 A1 * | 9/2001 | Uchihira et al. | 717/4 |
| 2004/0088685 A1 * | 5/2004 | Poznanovic | G06F 17/5045 717/140 |
| 2004/0088689 A1 * | 5/2004 | Hammes | G06G 17/5045 717/154 |
| 2009/0064095 A1 * | 3/2009 | Wallach et al. | 717/106 |
| 2009/0064120 A1 * | 3/2009 | Liu | G06F 8/452 717/160 |
| 2009/0089763 A1 * | 4/2009 | Chen et al. | 717/140 |
| 2009/0259828 A1 * | 10/2009 | Grover et al. | 712/220 |
| 2009/0259832 A1 * | 10/2009 | Grover et al. | 712/241 |
| 2009/0259996 A1 * | 10/2009 | Grover et al. | 717/136 |
| 2009/0259997 A1 * | 10/2009 | Grover et al. | 717/136 |
| 2010/0070956 A1 * | 3/2010 | Leung | G06F 8/452 717/143 |
| 2010/0199257 A1 * | 8/2010 | Biggerstaff | 717/104 |
| 2011/0029962 A1 * | 2/2011 | Nuzman | G06F 8/452 717/160 |
| 2011/0093837 A1 * | 4/2011 | Guenthner | G06F 8/45 717/149 |
| 2011/0314442 A1 * | 12/2011 | Bondhugula et al. | 717/106 |
| 2012/0079469 A1 * | 3/2012 | Gonion | G06F 8/456 717/160 |
| 2012/0254845 A1 * | 10/2012 | Yi et al. | 717/144 |
| 2012/0254888 A1 * | 10/2012 | Kalogeropulos | G06F 8/452 717/107 |
| 2013/0219378 A1 * | 8/2013 | Glaister et al. | 717/146 |
| 2014/0237459 A1 * | 8/2014 | Von Platen | G06F 8/452 717/155 |
| 2015/0058832 A1 * | 2/2015 | Gonion | G06F 8/433 717/150 |
| 2015/0248304 A1 * | 9/2015 | Chambers | G06F 9/445 717/149 |

OTHER PUBLICATIONS

Stratton et al., MCUDA: An Efficient IMplementation of CUDA Kernels on Multi-cores, published 2008, pp. 1-19.*

Rul et al., Towards Automatic Program Partitioning, published by ACM 2009, pp. 89-98.*

Ottoni et al., Communication Optimizations for Global Multi-Threaded Instrction Scheduling, publihsed by ACM 2008, pp. 222-232.*

Xue et al., Effective Loop Paritioning and Scheduling under Memory and Register Dual Constraints, publihsed by EDAA 2008, pp. 1202-1207.*

Hummel et al., Factoring A Method for Scheduling Parallel Loops, published by Communication of the ACm vol. 35, No. 8 1992, pp. 90-101.*

Nickolls et al., Scalable Parallel Programming, published by ACM Queue, Mar./Apr. 2008, pp. 40-53.*

* cited by examiner

METHOD FOR COMPILING A PARALLEL THREAD EXECUTION PROGRAM FOR GENERAL EXECUTION

BACKGROUND OF THE INVENTION

1. Field of the Invention

The invention relates generally to compiler systems and, more specifically, to a method for compiling a parallel thread execution program for general execution.

2. Description of the Related Art

Certain computer systems include a parallel processing subsystem that may be configured to concurrently execute multiple program threads that are instantiated from a common application program. Such systems are able to execute multiple instances of at least a portion of the application program in parallel to achieve execution speedup. CUDA is a parallel programming model known in the art for application programs that may be compiled to execute on parallel processing subsystems. An application program written for CUDA may include sequential C language programming statements, and calls to a specialized application programming interface (API) used for configuring and managing parallel execution of program threads. A function associated with a CUDA application program that is destined for concurrent execution on a parallel processing subsystem is referred to as a "kernel" function. An instance of a kernel function is referred to as a thread, and a set of concurrently executing threads may be organized as a thread block. A set of thread blocks may further be organized into a grid. Each thread is identified by an implicitly defined set of index variables. Each thread may access their instance of the index variables and act independently with respect to other threads based on the index variables.

An application program may include certain compiled functions for execution on a general purpose central processing unit (CPU) and other functions compiled for execution on a parallel processing subsystem. The functions compiled for execution on the CPU typically include native CPU instructions. The functions compiled for execution on the parallel processing subsystem typically include instructions for a virtual machine instruction set architecture (ISA) that may be mapped to a native ISA associated with the particular parallel processing subsystem. One virtual machine ISA known in the art is the parallel thread execution (PTX) ISA, which is designed to provide a stable programming model and instruction set for general purpose parallel processing. When an application program comprising compiled PTX kernel functions is loaded for execution within a computer system, the PTX kernel functions are mapped to the ISA of a parallel processing subsystem within the computer system. Certain parallel processing constructs are provided by the parallel processing subsystem, such as thread synchronization, thread identification, and certain specialized graphics operations such as texture map sampling.

In certain scenarios, a user may wish to execute an existing application program that is compiled for distribution to customers on a general purpose central processing unit (CPU) rather than on a parallel processing subsystem. Unfortunately, conventional CPUs are typically configured to execute only native instructions and do not include parallel processing constructs for execution of PTX operations. As a consequence, the existing application program may not be conventionally executed on a general purpose CPU.

As the foregoing illustrates, what is needed in the art is a technique for executing a compiled parallel application program on a general purpose CPU.

SUMMARY OF THE INVENTION

One embodiment of the present invention sets forth a computer-implemented method for executing a multi-threaded program on a general purpose processor, comprising translating the multi-threaded program into an intermediate representation including at least one parallel function, partitioning each parallel function within the intermediate representation into at least one operation group, classifying each operation group as either scalar or vectorizable, transforming each vectorizable operation group into vector instructions corresponding to computations performed by two or more threads when executing the multi-threaded program, and generating native executable code for the general purpose processor to process.

Other embodiments of the present invention include, without limitation, a computer-readable storage medium including instructions that, when executed by a processing unit, cause the processing unit to perform the techniques described herein.

One advantage of the disclosed technique is that programs compiled for multi-threaded execution on a parallel processing subsystem may be efficiently and advantageously executed instead on a general purpose processor.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
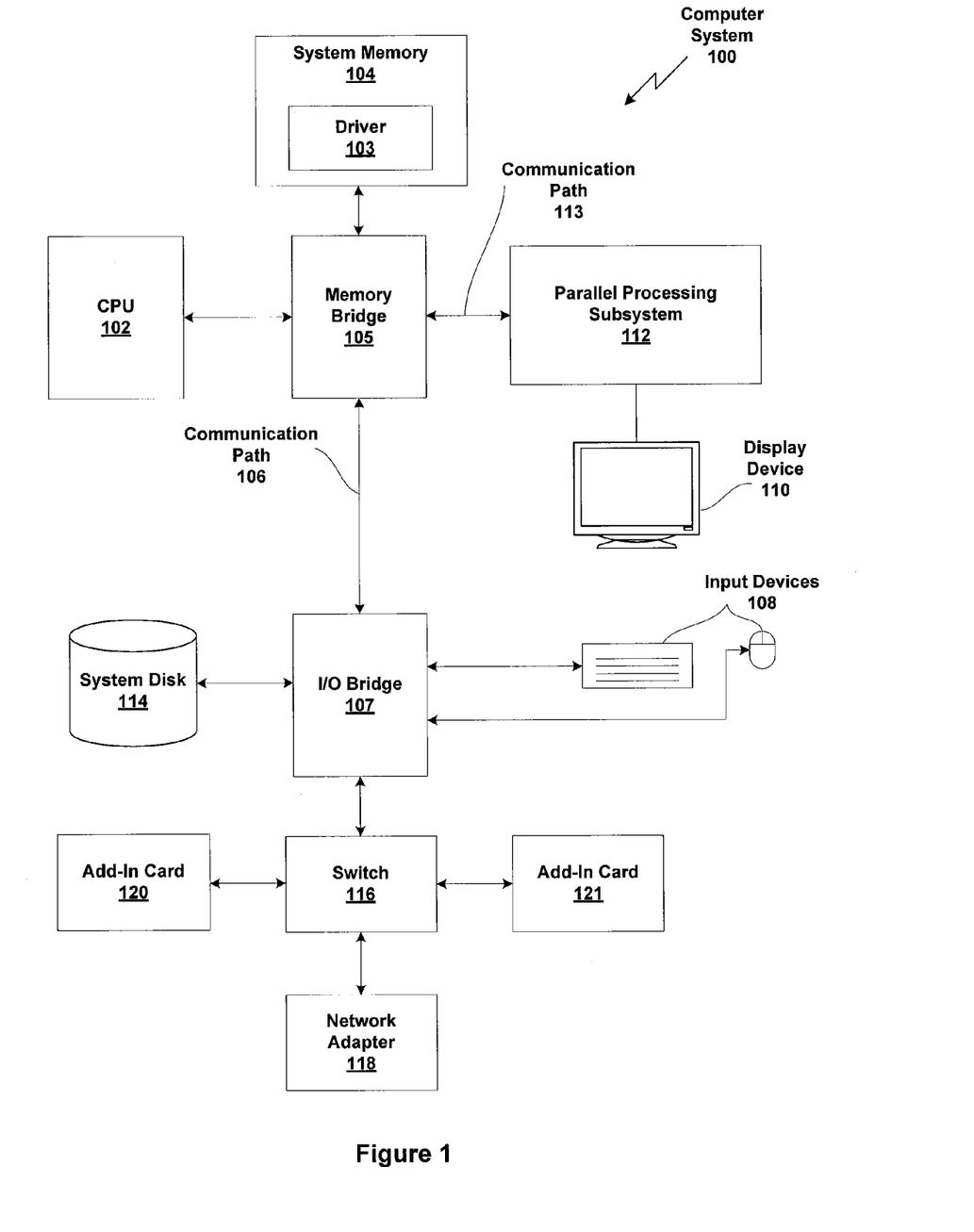
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 configured to communicate via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A graphics subsystem 112 is coupled to memory bridge 105 via a bus or other communication path 113 (e.g., a PCI Express, Accelerated Graphics Port, or HyperTransport link); in one embodiment, the graphics subsystem 112 delivers pixels to a display device 110 (e.g., a conventional CRT or LCD based monitor). A software device driver 103 may be configured to send graphics primitives over communication path 113 for the graphics subsystem 112 to generate pixel data for display on display device 110. More generally, the software device driver 103 provides management and communication functions for the graphics subsystem 112. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the graphics subsystem 112 incorporates circuitry optimized for graphics and video processing, including, for example, video output circuitry, and constitutes a graphics processing unit (GPU). In another embodiment, the graphics subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of graphics subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 or directly to CPU 102, rather than to memory bridge 105. In still other embodiments, I/O bridge 107 and memory bridge 105 might be integrated into a single chip. Certain embodiments may include two or more CPUs 102 and two or more graphics subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
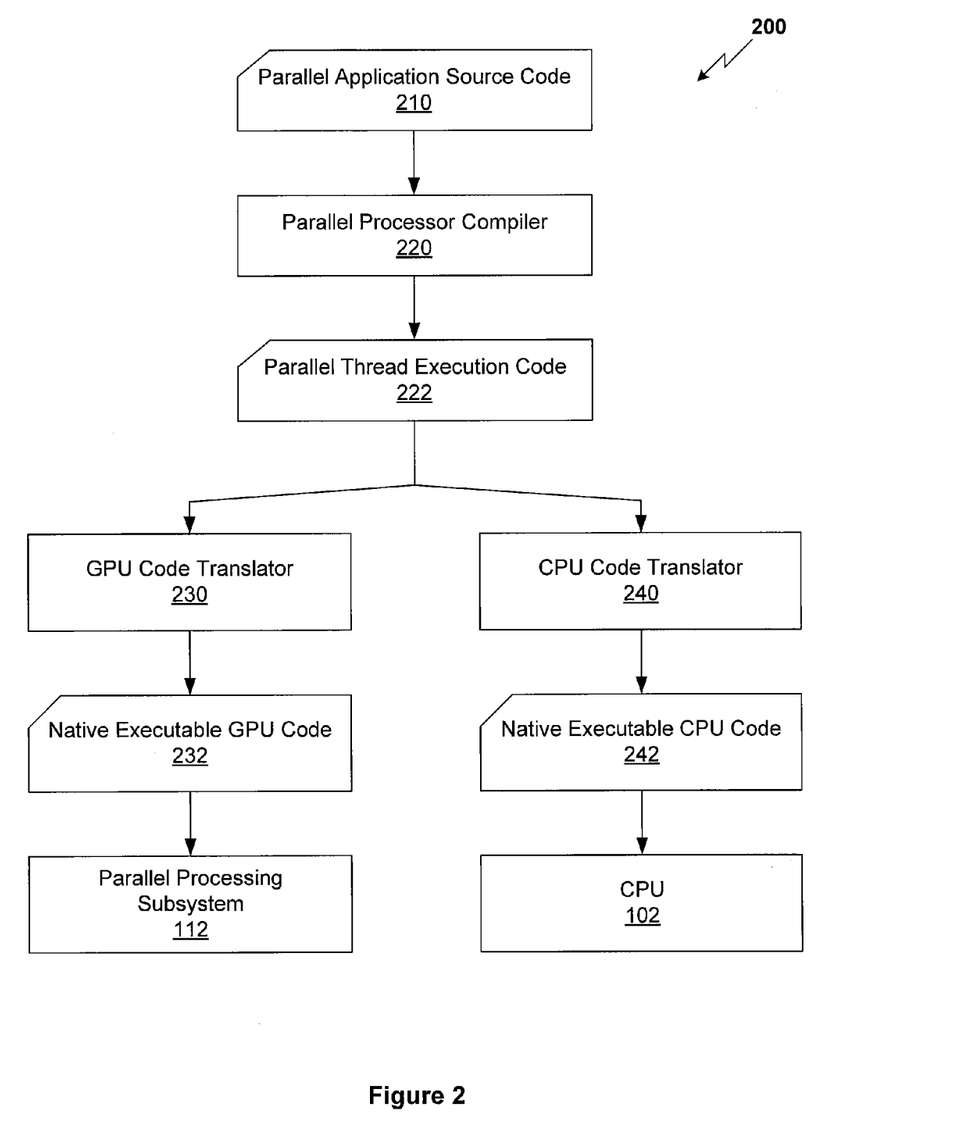
FIG. 2 illustrates a data flow for generating native executable code for both a graphics processing unit and a central processing unit from a common parallel executable code, according to one embodiment of the present invention.

FIG. 2 illustrates a data flow 200 for generating native executable code for both a graphics processing unit and a central processing unit from a common parallel executable code, according to one embodiment of the present invention. The parallel source code 210 includes, without limitation, programming instructions for at least one kernel function written to execute as a plurality of threads that are each an instance of the kernel function. The parallel processor compiler 220 is configured to conventionally compile the parallel application source code 210 into parallel thread execution code 222. In one embodiment, the parallel thread execution code 222 comprises instructions defined by the well-known parallel thread execution (PTX) virtual machine instruction set architecture (ISA).

A GPU code translator module 230 translates the parallel thread execution code 222 to corresponding native executable GPU code 232, comprising native instructions for the graphics subsystem 112 of FIG. 1. Any synchronization barriers within the parallel thread execution code 222 are implemented using native constructs available within the graphics subsystem 112. Furthermore, any special operations, such as texture sampling operations, are implemented by corresponding functional units within the graphics subsystem 112. In one embodiment, the GPU code translator module 230 resides within the software device driver 103, which is configured for execution by the CPU 102. In alternative embodiments, the GPU code translator module 230 resides within a developer tool-chain, such as an offline compiler. The GPU code translator module 230 may implement just in time (JIT) compilation to generate the native executable GPU code 232. The path from parallel application source code 210 through execution on the graphics subsystem 112 represents a conventional technique for executing a parallel application.

Embodiments of the present invention define a technique for translating parallel thread execution code 222 to native executable CPU code 242 for execution on the CPU 102. A CPU translator module 240 translates the parallel thread execution code 222 to corresponding native executable CPU code 242, comprising native instructions for the CPU 102. Certain special operations, such as texture sampling operations, are implemented as function calls to a library of corresponding methods. Furthermore, synchronization barriers within the parallel thread execution code 222 are transformed for serial execution as corresponding synchronization barriers within the native executable CPU code 242. Computations that depend on a thread identification number (threaded) may be remapped for execution as vector operations on the CPU 102, while computations that do not depend on threaded are remapped as scalar computation. The parallel thread execution code 222 may be mapped to one or more cores within the CPU 102. When two or more cores are available within the CPU 102, the mapped threads may execute concurrently for higher performance.

Figure 3:
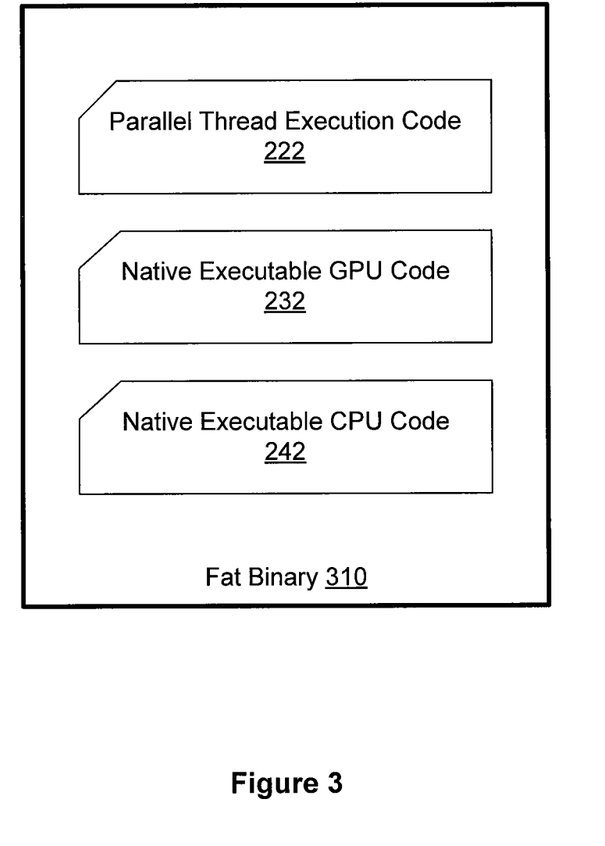
FIG. 3 illustrates a fat binary container configured to store parallel thread execution code, native executable graphics processing unit code, and native executable central processing unit code, according to one embodiment of the present invention.

FIG. 3 illustrates a fat binary container 310 configured to store parallel thread execution code 222, native executable GPU code 232, and native executable CPU code 242, according to one embodiment of the present invention. A parallel application program may be distributed from a developer to an end-user as compiled parallel thread execution code 222. Upon installation or first execution by the graphics subsystem 112, the GPU code translator 230 generates native executable GPU code 232 that is specifically configured for the particular graphics subsystem 112. The native executable GPU code 232 may be stored within the fat binary container 310 for subsequent execution. Similarly, upon installation or first execution by the CPU 102, the CPU code translator 240 generates native executable CPU code 242 that is specifically configured for the particular CPU 102. The native executable CPU code 242 may be stored within the fat binary container 310 for subsequent execution.

Figure 4A:
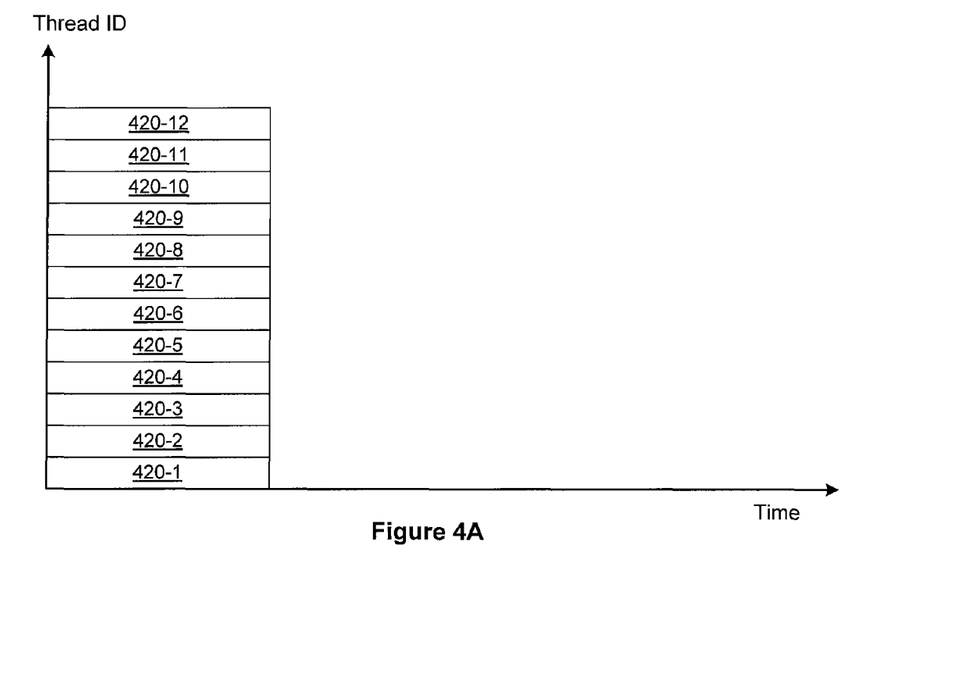
FIG. 4A illustrates a set of computations conventionally performed by individual threads within a parallel processing subsystem.

FIG. 4A illustrates a set of computations 420 conventionally performed by individual threads within the graphics subsystem 112 of FIG. 1. The computations 420 are configured to execute on individual threads within the graphics subsystem 112. Each computation 420 uses a thread ID as an input to cause each thread to perform a corresponding computation 420 on a unique set of data.

Figure 4B:
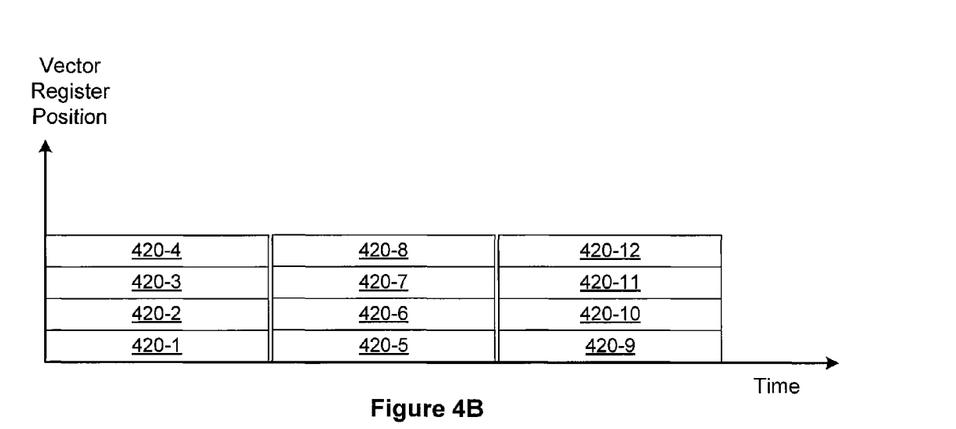
FIG. 4B illustrates the computations remapped as vector computations performed by a general central processing unit.

FIG. 4B illustrates the computations 420 remapped as vector computations performed by the general central processing unit 102 of FIG. 1. The computations 420-1 through 420-12 are organized to execute as three sequential sets of four-wide vector computations each. Input data for each vector computation is loaded from an appropriate location, based on a thread ID associated with a thread originally designated to perform the computation 420 on the input data. In one embodiment, the vector computation is performed according to the industry standard streaming single-instruction, multiple-data (SIMD) extension (SSE) to the standard x86 ISA. The SSE ISA extension defines a four-wide vector storage and processing system for x86 processors. In such an embodiment, the CPU code translator 240 remaps certain computations specified in the parallel thread execution code 222 to a corresponding set of vector computations based specified using the SSE ISA. The resulting remapped (vectorized) executable code comprises the native executable CPU code 242.

The CPU code translator 240 implements a PTX parser, which interprets the parallel thread execution code 222 to generate an intermediate representation of the parallel thread execution code 222. The intermediate representation comprises generic instructions for specifying computations and control flow for the parallel thread execution code 222. In one embodiment, an intermediate representation is implemented based on the well-known low level virtual machine (LLVM) system. In this embodiment, the CPU code translator 240 uses LLVM optimization and code generation to generate the native executable CPU code 242. The CPU code translator 240 implements certain transforms on the parallel thread execution code 222 to generate the intermediate representation. These include, without limitation, identification of each parallel kernel function and construction of a corresponding LLVM function, local variable and storage allocation, and translation of each PTX instruction to one or more LLVM instructions. For certain types of parallel thread computation, constructing an LLVM function from a given parallel kernel involves transforming computations associated with a set of parallel threads to a loop that sequentially executes the computations while changing one or more thread ID variables. Vectorization allows computation associated with four corresponding original threads to execute within an SSE regime per loop iteration. Scalar operations are computed redundantly by each parallel thread. Because results of these scalar operations are identical across the parallel threads, scalar operations need only be computed once by CPU 102 in the native executable code 242.

In addition to translating PTX code to an LLVM intermediate representation, certain LLVM intrinsic functions are added as part of a runtime environment to enable complete and correct execution of the parallel thread execution code 222. Intrinsic functions comprise native operations implemented within the graphics subsystem 112 that have no direct mapping to a particular instruction implemented within the CPU 102. These include, without limitation, built-in variable access functions for thread identification, block identification, block dimension, and grid dimension, certain transcendental operations, thread synchronization, texture sampling, and atomic memory access. Persons skilled in the art will recognize that different techniques may be used to perform the above transformations and translations from PTX to an intermediate representation, and from the intermediate representation to the native executable CPU code 242 without departing the scope and spirit of the present invention.

Figure 5:
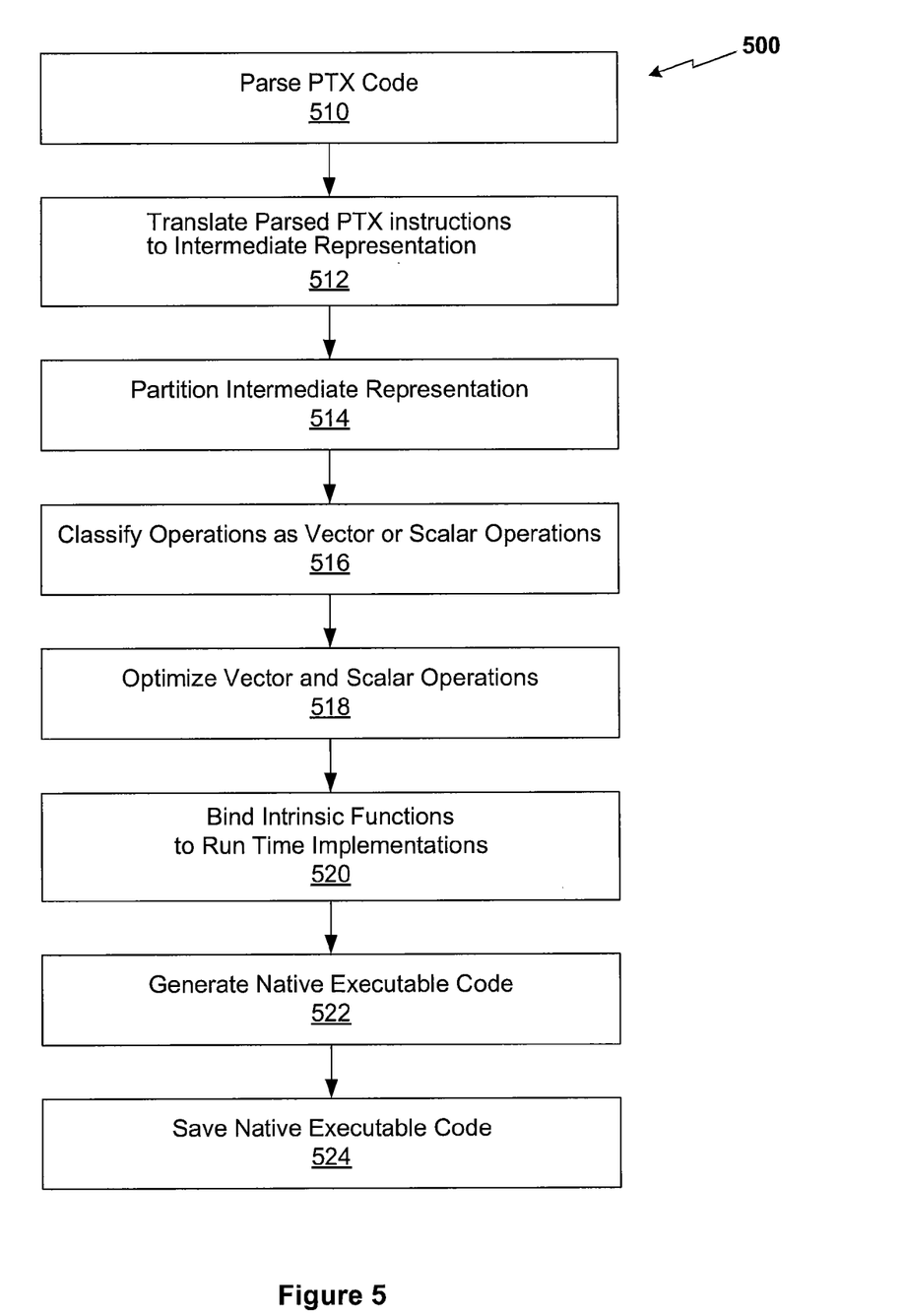
FIG. 5 sets forth a flowchart of method steps for translating parallel executable code to native executable central processing unit code, according to one embodiment of the present invention.

FIG. 5 sets forth a flowchart of method steps 500 for translating the parallel thread execution code 222 of FIG. 2 to the native executable CPU code 242, according to one embodiment of the present invention. Although the method steps are described in conjunction with the system of FIG. 1, persons skilled in the art will understand that any system configured to perform the method steps, in any order, is within the scope of the present invention.

The method begins in step 510, where the CPU code translator 240 parses the parallel thread execution code 222, comprising PTX instructions. In step 512, the CPU code translator 240 translates parsed PTX instructions to an LLVM intermediate representation for the instructions. In step 514, the CPU code translator 240 partitions the intermediate representation into groups of parallel operations associated with a particular kernel function. Each kernel function may comprise scalar operations, parallel (vectorizable) operations, or any combination thereof. In one embodiment, vectorizable operations are transformed from individual, parallel thread operations to vector computations to be performed in groups of operations that are structured as SSE vector instructions. Persons skilled in the art will recognize that a given group may be executed without requiring a synchronization step. However, synchronization should be performed across different groups. In step 516, the CPU code translator 240 classifies operations within the intermediate representation as either vector or scalar operations. As described previously in FIGS. 4A and 4B, the vector instructions compute results for a set of operations otherwise computed separately by individual, parallel threads. Operations that receive thread identification information as an input are generally vectorizable, while operations that do not take thread identification information as an input are generally scalar operations. In step 518, the CPU code translator 240 optimizes operations comprising vector instructions and scalar instructions using any technically feasible optimization techniques. Each group of operations is transformed into a loop construct for execution. Each loop construct encompassing a given group of transformed operations is structured to represent an equivalent set of arithmetic or logical operations on equivalent input data that could otherwise be performed by individually executing threads. In step 520, intrinsic functions specified in the parallel thread execution code 222 are bound to corresponding run time implementations. These intrinsic functions include, without limitation, built-in variable access functions for thread identification and configuration information, certain transcendental operations, thread synchronization, texture sampling, and atomic memory access. At this point, the intermediate representation is complete and ready to be converted into executable code for a target CPU, such as CPU 102.

In step 522, the CPU code translator 240 generates native executable CPU code 242 for execution on CPU 102. The code may include constructs for executing on multiple CPU cores and executing multiple simultaneous arithmetic operations via vector instructions, such as SSE instructions. In particular, the native executable CPU code 242 is generated to include CPU instructions for a CPU thread that performs operations associated with a thread block originally specified within the parallel thread execution code (e.g., PTX code) 222. In this way, operations associated with a given thread block may execute as a set of operations within a single CPU thread. The CPU thread may require a synchronization barrier for synchronization with a different CPU thread that is executing operations associated with a different thread block. Each CPU thread may represent a mapping from a plurality of individual vectorizable operations within a thread block into a smaller number of vector instructions, such as SSE instructions, within an appropriate loop construct formed by CPU instructions. The loop construct is configured to perform a set of operations that identically correspond to operations performed by a thread block within the parallel thread execution code 222. Similarly, each CPU thread may also represent a mapping from a plurality of individual scalar operations within a thread block to corresponding CPU instructions within the CPU thread. In general, mapping scalar instructions associated with threads comprising a thread block to a CPU thread may be a many to one mapping because identical results are typically computed by each original scalar operation. A plurality of CPU threads may execute concurrently to perform operations associated with multiple thread blocks, which may be concurrent thread blocks. Persons skilled in the art will recognize that a given operation specified within the parallel thread execution code 222 may correspond to one or more PTX instructions, and the operation may map to one or more CPU instructions. Any technically feasible technique may be implemented to optimize CPU instructions generated from the intermediate representation of the PTX instructions. Such optimization may include mapping vectorizable instructions into SSE instructions within a loop construct, and the like. In step 524, the CPU code generator 240 saves the native executable CPU code 242. In one embodiment, the CPU code generator 240 saves the native executable CPU code 242 within a fat binary, such as fat binary 310 of FIG. 3. The method terminates in step 524.

In sum, a technique for transforming a compiled multi-threaded program into an executable vectorized program for execution on a general purpose processor is disclosed. The technique includes translating the compiled multi-threaded program into a generic intermediate representation that remaps certain individual thread computations into a set of vector operations for execution on a general purpose central processing unit configured to execute vector instructions.

One advantage of the disclosed technique is that programs compiled for multi-threaded execution on a parallel processing subsystem may be efficiently and advantageously executed instead on a general purpose processor.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A computer-implemented method for executing a multi-threaded program on a general purpose processor, the method comprising:
    translating the multi-threaded program into an intermediate representation including at least one parallel function;
    partitioning each parallel function within the intermediate representation into at least one operation group;
    classifying each operation group as either scalar or vectorizable;
    transforming each vectorizable operation group into vector instructions corresponding to computations performed by two or more threads when executing the multi-threaded program;
    binding each of one or more intrinsic functions included within the multi-threaded program to a different runtime implementation corresponding to the intrinsic function; and
    generating, based on the vector instructions, native executable code for the general purpose processor to process.

2. The method of claim 1, wherein the multi-threaded program comprises a plurality of single-instruction multiple-data instruction constructs, and the intermediate representation comprises a plurality of vector instruction constructs.

3. The method of claim 2, wherein the intermediate representation is defined by a low-level virtual machine instruction set architecture.

4. The method of claim 1, wherein at least one of the one or more intrinsic function comprises a built-in variable access function, a transcendental math operation, a thread synchronization operation, a texture sampling operation, or an atomic memory access operation.

5. The method of claim 1, wherein generating native executable code comprises transforming each intermediate representation into at least one corresponding processor-dependent machine instruction.

6. The method of claim 5, wherein generating native executable code further comprises transforming at least one intrinsic function call residing within the multi-threaded program into a runtime function call.

7. The method of claim 5, wherein generating native executable code further comprises transforming the at least one vectorizable operation into an equivalent loop construct within the native executable code.

8. The method of claim 7, wherein the equivalent loop construct includes at least one vector instruction configured to perform a particular operation on at least two different pairs of input data.

9. The method of claim 8, wherein the at least one vector instruction comprises a streaming single-instruction, multiple-data extension instruction.

10. A non-transitory computer-readable storage medium including instructions that, when executed by a processor, cause the processor to execute a multi-threaded program, by performing the steps of:
    translating the multi-threaded program into an intermediate representation including at least one parallel function;

partitioning each parallel function within the intermediate representation into at least one operation group;

classifying each operation group as either scalar or vectorizable;

transforming each vectorizable operation group into vector instructions corresponding to computations performed by two or more threads when executing the multi-threaded program;

binding each of one or more intrinsic functions included within the multi-threaded program to a different runtime implementation corresponding to the intrinsic function; and generating, based on the vector instructions, native executable code for the general purpose processor to process.

11. The non-transitory computer-readable storage medium of claim 10, wherein the multi-threaded program comprises a plurality of single-instruction multiple-data instruction constructs, and the intermediate representation comprises a plurality of vector instruction constructs.

12. The non-transitory computer-readable storage medium of claim 11, wherein the intermediate representation is defined by a low-level virtual machine instruction set architecture.

13. The non-transitory computer-readable storage medium of claim 10, wherein at least one of the one or more intrinsic functions comprise a built-in variable access function, a transcendental math operation, a thread synchronization operation, a texture sampling operation, or an atomic memory access operation.

14. The non-transitory computer-readable storage medium of claim 10, wherein generating native executable code comprises transforming each intermediate representation into at least one corresponding processor-dependent machine instruction.

15. The non-transitory computer-readable storage medium of claim 14, wherein generating native executable code further comprises transforming at least one intrinsic function call residing within the multi-threaded program into a runtime function call.

16. The non-transitory computer-readable storage medium of claim 14, wherein generating native executable code further comprises transforming the at least one vectorizable operation into an equivalent loop construct within the native executable code.

17. The non-transitory computer-readable storage medium of claim 16, wherein the equivalent loop construct includes at least one vector instruction configured to perform a particular operation on at least two different pairs of input data.

18. The non-transitory computer-readable storage medium of claim 17, wherein the at least one vector instruction comprises a streaming single-instruction, multiple-data extension instruction.

19. A computing device comprising:
a memory that stores a code translator; and
a processor that is coupled to the memory and, upon executing the code translator, is configured to:
translate a multi-threaded program into an intermediate representation;
partition the intermediate representation into one or more groups of parallel operations associated with a kernel function;
classify operations within the intermediate representation as either scalar operations or vectorizable operations, wherein each group of parallel operations comprises a set of vectorizable operations;
transform each set of vectorizable operations into a loop construct corresponding to operations performed on equivalent data performed by two or more threads when executing the multi-threaded program; and
generate, based on the loop constructs, native executable code for the processor to process.

20. The system of claim 19, wherein the processor is further configured to bind one or more intrinsic functions specified in the multi-threaded program to corresponding run-time implementations.

21. The system of claim 20, wherein generating the native executable code is further based on the corresponding run-time implementations.

* * * * *